(12) United States Patent
Danell

(10) Patent No.: US 6,173,525 B1
(45) Date of Patent: Jan. 16, 2001

(54) CHANTERELLE MYCELIUM

(75) Inventor: Eric Danell, Uppsala (SE)

(73) Assignee: Cantharellus AB, Stockholm (SE)

( * ) Notice: Under 35 U.S.C. 154(b), the term of this patent shall be extended for 0 days.

(21) Appl. No.: 08/933,555

(22) Filed: Sep. 19, 1997

(51) Int. Cl.$^7$ ..................................... A01G 1/04
(52) U.S. Cl. ........................... 47/1.1; 47/58.1; 435/254.1
(58) Field of Search ................. 47/1.1, 58.1; 435/254.1

(56) References Cited

U.S. PATENT DOCUMENTS

| | | |
|---|---|---|
| 4,683,195 | 7/1987 | Mullis et al. . |
| 4,965,188 | 10/1990 | Mullis et al. . |
| 5,075,217 | 12/1991 | Weber . |
| 5,126,239 | 6/1992 | Livak et al. . |
| 5,364,759 | 11/1994 | Caskey et al. . |
| 5,487,985 | 1/1996 | McClelland et al. . |

OTHER PUBLICATIONS

Danell, E., et al., "Successful cultivation of the golden chanterelle," *Nature*, vol. 385, p. 303, Jan. 23, 1997.

"Flavorful Fungus Farmed for 1st Time in Oregon Chanterelle Mushrooms Grown in Greenhouses," *San Francisco Chronicle*, Jan. 23, 1997, Final Edition, News Page Section A1.

Warrick, J., "Science Notebook: Agriculture: Recipe for Raising Mushrooms," *The Washington Post*, Final Edition, A Section, p. 2, vol. 120, Issue 53 (Jan. 97).

Danell, E., et al., First International Conference on Mycorrhizae, University of California at Berkeley, Aug., 1996, Abstract, pp. 39–40.

Eric Danell, "*Cantharellus cibarius*: Mycorrhiza Formation and Ecology," ACTA Universitatis Upsaliensis, Uppsala 1994, Doctoral dissertation.

Gardes, M., et al., "ITS primers with enhanced specificity for basidiomycetes—application to the identification of mycorrhizae and rusts," *Molecular Ecology*, vol. 2, pp. 113–118 (1993).

Jentschke, G., et al., "Culture of mycorrhizal tree seedlings under controlled conditions: Effects of nitrogen and aluminum," *Physiol. Plant.*, 81:408–416 (1991).

Gardes, M., et al., "Identication of indigenous and introduced symbiotic fungi . . . and mitochondrial ribosomal DNA," *Canadian Journal of Botany*, vol. 69, No. 1, pp. 180–190 (1991).

Danell, E., et al., "Methods for Isolation of Cantharellus Species, and the Synthesis of Ectomycorrhizae with Pices Abies," *Mycotaxon*, vol. 38, pp. 141–148 (1990).

Dahlberg, A., et al., "Population structure and dynamics in *Siullus bovinus* as indicated by spatial distribution of fungal clones," *New Phytol.*, 115:487–493 (1990).

Straatsma, G, et al., "Carboxylated Metabolic Intermediates . . . of the Mycorrhizal Mushroom *Catharellus cibarius* Fr.," *J. Plant Physiol.*, vol. 125, pp. 377–381 (1986).

Nylund, J., et al., "Structure and Physiology of Ectomycorrhizae," *New Phytol.*, 91:63–79 (1982).

Molina, R., et al., "Isolation, Maintenance, and Pure Culture . . . Fungi," *Methods and Principles of Mycorrhizal Research*, N.C. Schenck, Ed., American Phytopathological Society, St. Paul, MN, pp. 115–129 (1982).

*Primary Examiner*—Leon B. Lankford, Jr.
(74) *Attorney, Agent, or Firm*—Fish & Richardson, P.C., P.A.

(57) ABSTRACT

A strain of chanterelle (*C. cibarius* Fr.Fr.) designated SNGT2-A is described herein. SNGT2-A can be grown in axenic culture as vegetative mycelia. SNGT2-A has a DNA fingerprint that distinguishes it from all other *C. cibarius* strains tested.

9 Claims, 1 Drawing Sheet

CHANTERELLE MYCELIUM

BACKGROUND OF THE INVENTION

*Cantharellus cibarius*, the chanterelle, is an edible mushroom that is highly desired because of its texture and delicate taste.

Cantharellus is a homobasidiomycete genus, i.e., spores are found on unicellular basidia, in contrast to spores of a heretobasidiomycete genus. The Cantharellus fruit body is gymnocarpic, e.e. naked from the time of its first appearance and not protected by a veil as in Amanita. The pileus (cap) has a sterile top, which distinguishes it from the Clavariaceae. Cantharellus fruit bodies are fleshy and long lived but not perennial. The hymenium (spore producing layer) is either smooth or folded, with ridges on the stem and pileus. The gill-like ridges of Cantharellus differ from true gills of the order Agaricales. The Cantharellus hymenium thickens as new basidia develop over the layer of older ones. By contrast, the basidia form a monolayer in the Agaricales. Cantharellus basidia are stichic and long, and bear long curved sterigmata. Spores are smooth, white or yellow and of variable size. The number of spores per basidium varies between 2 and 8 within the same fruit body's hymenium. The haploid chromosome number in *C. cibarius* is 2. No cystidia (sterile hyphal ends with characteristic morphologies different from normal sterile hyphal ends) are present. Hyphae are monomitic, i.e. have thin-walled generative hyphae. The presence of clamp connections distinguishes Cantharellus from Craterellus and Pseudocraterellus. *C. pallens* and *C. amethysteus* are sometimes treated as varieties of *C. cibarius*, but sometimes considered separate species.

Cantharellus is included in section Leptocantharellus. The other subgenus of this section, Phaeocantharellus, is characterized by black or brown aliphatic pigments as in *C. tubaeformis*, whereas *Cantharellus cibarius* cytoplasm contains bicyclic carotenoid pigments which are characteristic of the subgenus Cantharellus. A related organism, *C. pallens* has pale fruit bodies but a pigmented hymenium. Carotenoids are rare among agaric fungi.

*C. cibarius* is an ectomycorrhizal fungus, i.e., it is capable of colonizing the roots of appropriate host trees. *C. cibarius* forms external yellow, white or brown mantles and internal Hartig nets between cortical cells, which distinguishes it from saprobic fungi.

About 13 volatile acids and 36 other volatile compounds have been identified from *C. cibarius*. Pyysalo, H., Acta Chem. Scand. B30:235–244 (1976). Octenols (causing the characteristic smell of mushrooms in general), caproic acid and acetic acid were found in highest concentrations.

Because it is a highly appreciated species, chanterelles have become an item of commerce. Fresh, salted and canned fruit bodies of *C. cibarius* are imported into various European countries. North-American chanterelles are exported to Europe, mainly Germany, because the chanterelle population is declining in that country. American chanterelles (*C. subalbidus* Smith & Morse and *C. formosus* Corner) are considered to be of lower quality, in terms of taste and texture, compared to the European chanterelle (*C. cibarius* Fr.Fr.).

SUMMARY OF THE INVENTION

Figure 1:
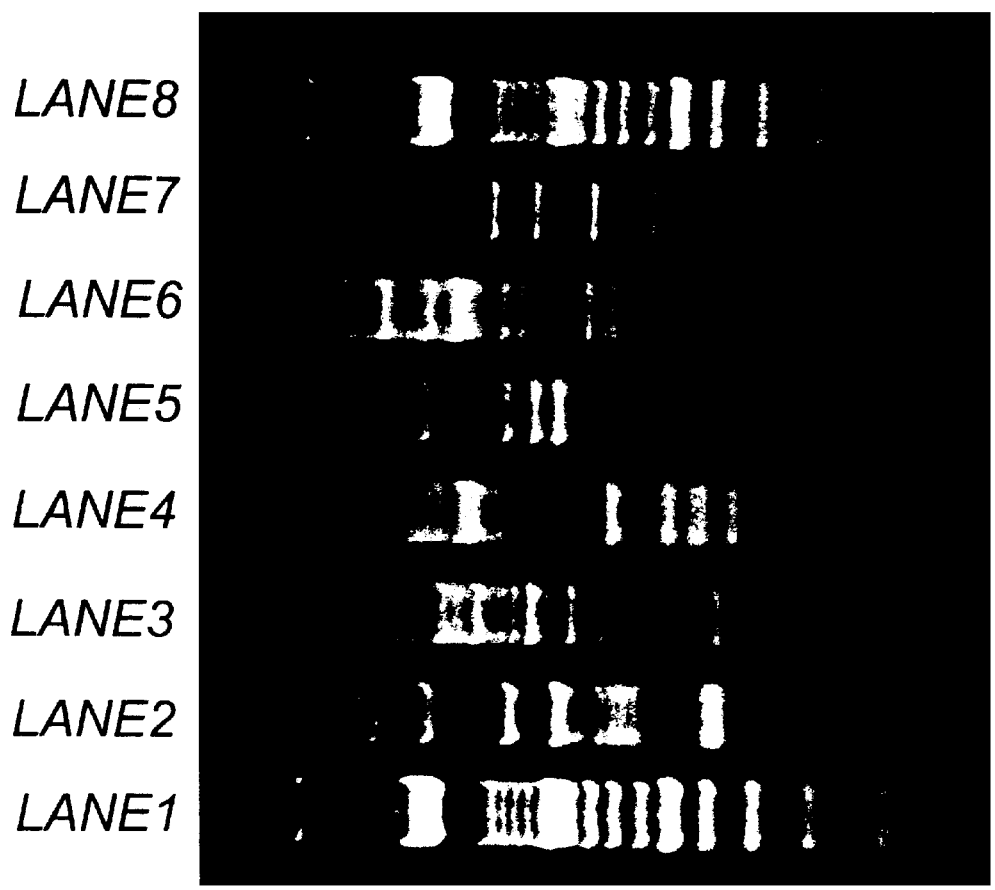
FIG. 1 is a photograph of an agarose gel, showing the amplified products of DNA isolated from axenic mycelia of strain SNGT2-A, using random 10-mer primers. Lane 1: molecular marker (100 bp ladder); lane 2: OPS-02 primer; lane 3: OPS-04 primer; lane 4: OPS-05 primer; lane 5: OPS-10 primer; lane 6: OPS-15 primer; lane 7: OPS-17 primer; lane 8: molecular marker (100 bp ladder).

Isolated mycelium of a chanterelle designated SNGT2-A are disclosed herein. The mycelium can be substantially purified to reduce the amount and number of contaminating, co-isolated organisms. The mycelium can be grown in axenic culture on appropriate medium. Strain SNGT2-A has a unique DNA fingerprint that distinguishes it from all other Cantharellus strains tested. Chanterelle mycelium derived from a subculture of SNGT2-A are also included in the invention.

Other features and advantages of the invention will be apparent from the following description of the preferred embodiments thereof, and from the claims.

DESCRIPTION OF THE PREFERRED EMBODIMENTS

Chanterelle (*Cantharellus cibarius* Fr:Fr) strain SNGT2-A is a fungus of the subdivision Basidiomycotina. SNGT2-A was isolated from a forest in Uppland, Sweden from fruiting body tissue of a naturally-occurring individual. Uppland, Sweden. Mycelia are isolated when grown in an environment other than the environment in which the mycelia are naturally found. For example, SNGT2-A mycelium is isolated when fruiting body tissue is initially transferred to suitable agar media, for example, Murashige & Skoog medium (MS).

Isolated SNGT2-A mycelia may contain co-isolated organisms, e.g., bacterial and fungal contaminants. These isolated SNGT2-A mycelia can be purified. For example, an isolated SNGT2-A mycelium can be grown on an agar medium containing antibiotics. After a period of growth, hyphae that are surrounded by fewer contaminants than the original inoculum are subcultured to a fresh agar plate. Repeated subculturing results in an SNGT2-A chanterelle mycelium that is substantially purified and eventually in a mycelium that is axenic. A chanterelle mycelium derived from a subculture of SNGT2-A can be obtained, for example, by continued propagation of axenic SNGT2-A mycelia.

Mycelium of SNGT2-A grows on Modified Fries Medium (MFM) and Murashige & Skoog medium (MS). Vegetative *C. cibarius* mycelium typically are reinoculated on fresh MFM every 8 weeks if incubated at 20° C. in the dark. The mycelium is white or yellow when growing on MFM, although carotenoid concentrations within the mycelium vary from time to time, depending on carbon dioxide levels and incubation temperature. The growth rate of *C. cibarius* SNGT2-A mycelia in vitro can be about 0.5 mm/day, which is slightly less than the growth rate that has been estimated for mycelia in the field. There is little or no growth on malt agar or potato dextrose agar (PDA) media.

SNGT2-A mycelium exhibits characteristics diagnostic for *C. cibarius* mycelium on MFM agar plates, e.g., frequent clamp connections and a hyphal thickness of about 3 $\mu$m. Moulds that may sometimes be contaminants of chanterelle cultures have no clamp connections and have hyphae less than 3 $\mu$m in width.

SNGT2-A can also be identified as a strain of *C. cibarius* based on the length of the internal transcribed spacer (ITS) region in ribosomal DNA (rDNA). The rDNA ITS of Swedish *C. cibarius* is 1400 base pairs long, which readily distinguishes this species from many other species of ectomycorrhizal fungi. The ITS typically is amplified from SNGT2-A DNA by polymerase chain reaction (PCR) with a primer complementary to the 18S rDNA gene and a primer complementary to the 28S rDNA gene. Illustrative examples of suitable primers for amplifying rDNA ITS include primers known as ITS1 and ITS4. White, T., et al., in PCR protocols: a guide to methods and applications, Innis, M., Gelfand, D., Sninsky, J., and White, T., eds., Academic Press, New York (1990) pp. 315–322. PCR can be carried out as described in U.S. Pat. Nos. 4,683,195 and 4,965,188, incorporated herein by reference, and subsequent modifications thereof. The length of the amplified ITS product is then determined, e.g., by agarose gel electrophoresis, and compared to a molecular weight standard or a reference ITS product, such as a *C. cibarius* ITS product amplified from DNA of a naturally occurring chanterelle fruit body. Because the ITS1 and ITS4 primers can discriminate among fungal species, lack of sterility in the DNA source material does not necessarily hamper the analysis.

RFLPs (restriction fragment length polymorphisms) in the ITS are also useful in distinguishing SNGT2-A from other mushroom species. The ribosomal DNA ITS region of SNGT2-A mycelia is amplified as described above, the product is digested with various restriction enzymes and the digestion products are separated by gel electrophoresis. The length and number of digestion products are compared to a *C. cibarius* reference ITS product, such as an ITS product prepared from a naturally occurring chanterelle fruit body. The results serve to confirm that the mycelia are in fact *C. cibarius*.

*C. cibarius* and *C. pallens* produce identical RFLP patterns, suggesting that a close relationship appears to exist between these two species. However, other Cantharellus spp. and other mushroom species are easily distinguished. The ITS length and RFLP patterns from different Swedish biotopes and from different geographical sites in Sweden (both pine and birch forests) are similar.

SNGT2-A can be distinguished from other *C. cibarius* strains by molecular analysis of genetic polymorphisms, e.g., DNA fingerprinting. Polymorphisms include, without limitation, simple sequence repeat (SSR) polymorphisms, arbitrarily primed polymerase chain reaction (AP-PCR) polymorphisms and random amplification of polymorphic DNA (RAPD) polymorphisms. See, e.g., U.S. Pat. Nos. 5,075,217; 5,364,759; 5,487,985; and 5,126,239, incorporated herein by reference. Techniques involving the use of short primers (e.g., 5–11 nucleotides) preferably are performed on freshly prepared, uncontaminated DNA because contaminating DNA creates a greater likelihood that the short primers will anneal to DNA other than *C. cibarius* strains, thus complicating the interpretation of the band patterns. Mycelia of SNGT2-A have, within experimental variation, substantially the same DNA fingerprint as that shown in FIG. 1.

Mycelia of *C. cibarius* strain SNGT2-A are available from Cantharellus AB, Box 7823, S-103 97, Stockholm, Sweden, or successors or assigns thereof, or is available from the american type culture collection depository, affording permanence of the deposit and ready accessibility thereto by the public if a patent is granted. The mycelia are taken from the same deposit maintained by the inventor since prior to the filing date of this application. All restrictions on the accessibility of the mycelia will be irrevocably removed upon the issuance of a patent; mycelia will be maintained with all the care necessary to keep them viable and uncontaminated for a period of 30 years, or 5 years after the most recent request, or for the effective life of the patent, whichever is longer, and will be replaced if they become non-viable during that period. Ready accessibility, however, is not to be construed as a license to practice the invention.

*C. cibarius* is considered to have a broad host specificity with respect to tree species with which it can form an ectomycorrhizal association. SNGT2-A is contemplated to have a similarly broad host range. For example, *Picea abies* and *Pinus sylvestris* are suitable host trees for *C. cibarius* and for SNGT2-A. Nevertheless, it is contemplated that SNGT2-A may be better adapted to some host species or biotopes than to others.

Mycelia of SNGT2-A can be used to develop mycorrhiza and fruiting bodies for commerce and for population replenishment in areas where Cantharellus populations are declining. SNGT2-A is also useful for comparative studies to determine taxonomic relationships between *C. cibarius* and other important fungal species. For example, SNGT2-A can be used as reference material to determine whether a particular fungal culture is contaminated by *C. cibarius* or is some other fungal species. SNGT2-A can also be used as reference material to determine whether naturally occurring mushrooms in a geographical location of commercial importance belong to the species *C. cibarius* or belong to some other mushroom species.

The invention will be further understood with reference to the following illustrative embodiments, which are purely exemplary and should not be taken as limiting the true scope of the present invention as described in the claims. All references cited in the present application are expressly incorporated by reference herein.

EXAMPLES

Example 1

Isolation of SNGT2-A from Fruit Body Tissue

A total of 229 fruit bodies of *C. cibarius* were collected from 13 coniferous forests in the province of Uppland, Sweden. Under sterile conditions, small samples of tissue from the inside of the fruit bodies were transferred to one of the following agar media:

1. Murashige & Skoog medium (MS) as shown in Table 1, supplemented with 50 ppm streptomycin, 50 ppm ampicillin and 5 ppm benomyl. The medium was filtered through a 0.2 $\mu$m cellulose acetate filter (Sartorius) and then mixed with an autoclaved agar solution containing agar (1.2% w/v) and 0.05% w/v activated charcoal. The mixture was poured into 9-cm petri dishes and allowed to cool.

2. Modified Fries medium (MFM) as shown in Table 1 was supplemented with streptomycin, ampicillin and benomyl, and sterile filtered as described above. The medium was then mixed with autoclaved agar (1.2% w/v) without activated charcoal. The mixture was poured into 9 cm petri dishes and allowed to solidify. Activated charcoal (0.05% w/v) was added on top of the agar surface after cooling.

3. MFM with C-elements as described in Straatsma, G. and Bruinsma, J., J. Plant Physiol. 125:377–381 (1986).

4. MS medium prepared as described above except that activated charcoal was omitted.

Samples on each medium were incubated in the dark at 20° C. All tissue samples were surrounded or embedded in mucus of bacterial origin within a few days. Growth of chanterelle mycelia was not observed until after a 17 to 53-day lag period (about 35 days on average). Chanterelle mycelial growth was only observed on MS medium with

TABLE 1

Composition of Modified Fries Medium (MFM) and Murashige & Skoog Medium (MS)

|  | MFM | MS |
|---|---|---|
| D (+) glucose | 2.20 g | 0 |
| D (−) fructose | 2.00 g | 0 |
| Sucrose | 0 | 20 g |
| NH4Cl | 0.58 g | 0 |
| Succinic acid | 0.59 g | 0 |
| Meso-inosit | 10 mg | 100 mg |
| Macrostock | 50 ml | 100 ml |
| Eriksson microstock | 1 ml | 1 ml |
| Fries vitamin stock | 5 ml | 5 ml |
| Total volume | 1000 ml pH 5.5 | 1000 ml pH 4.2 |
| Macrostock (g/1000 ml): | | |
| KH2PO4 | 4.00 | 1.7 |
| MgSO4 7H2O | 2.00 | 3.7 |
| NaCl | 0.40 | 0.0 |
| CaCl2 2H2O | 0.52 | 4.4 |
| NH4NO3 | 0.00 | 16.5 |
| KNO3 | 0.00 | 19.0 |
| Eriksson microstock[1] (per 200 ml): | | |
| EDTA Titriplex III | 1.90 g | |
| FeSO4 7H2O | 1.40 g | |
| MnSO4 H2O | 170 mg | |
| H3BO3 | 63 mg | |
| ZnSo4 7H2O | 287 mg | |
| KI | 75 mg | |
| NaMoO4 2H2O | 2.50 mg | |
| CuSO4 5H2O | 0.25 mg | |
| CoCl2 6H2O | 0.25 mg | |
| Fries vitamin stock[2] (mg/250 ml): | | |
| Thiamine | 5.0 | |
| Pyridoxine | 5.0 | |
| Riboflavine | 5.0 | |
| Biotin | 1.25 | |
| Nicotinamide | 5.0 | |
| P-aminobenzoic acid | 5.0 | |
| Pantothenic acid | 5.0 | |

[1]From Eriksson, T. Physiol. Plant. 18:976–993 (1965).
[2]From Fries, N. Trans. Br. Mycol. Soc. 70:319–324 (1978).

activated charcoal. The charcoal may adsorb toxic compounds that may be present in the autoclaved agar.

Most contaminating moulds in the tissue samples were suppressed by the fungicide. Those moulds that were not suppressed by fungicide appeared within about two weeks, well before the appearance of C. cibarius mycelia.

About 24% of the tissue samples generated mycelia that grew beyond the bacterial growth zone. Peripheral hyphae from MS+charcoal medium were transferred to fresh MS+charcoal plates. Subculturing of peripheral hyphae was repeated until axenic mycelia were obtained. One of the axenic mycelial cultures was designated SNGT2-A.

SNGT2-A mycelium grew below the agar surface on MS media. Mycelia were weakly pigmented, giving the colonies a greyish appearance. SNGT2-A mycelia had frequent clamp connections and a hyphal thickness of about 3 μm, characteristics that identified it as C. cibarius. See, e.g., FIG. 1E of Danell, E., Ph.D. Thesis, Swedish Agricultural University, Uppsala, Sweden (1994); http://www.mykopat.slu.se/mycorrhiza/kantarellfiler.

Example 2

Description of SNGT2-A Mycelial Culture on Other Media

The axenic SNGT2-A culture of Example 1 was transferred to MFM agar plates without activated charcoal.

SNGT2-A mycelium turned bright yellow after the first transfer and grew quite slowly (0.2–0.3 mm/day). SNGT2-A mycelia growing on MFM generally consisted of a white, aerial mycelium with a yellow centre.

The mycelium was generally reinoculated on to fresh MFM plates every 2 months, although reinoculation was also successful after 4 months. After a few weeks on MFM medium, the mycelium spontaneously switched from slow growth and pronounced pigment production to rapid growth (0.5 mm/day) and low pigment production.

A portion of an SNGT2-A mycelium was transferred to MFM medium with C-elements. Straatsma, G. and Bruinsma, J., J. Plant Physiol. 125:377–381 (1986). Under these conditions, radial growth significantly decreased, and hyphal density increased. The major part of the mycelium was below the agar surface. Mycelia on this medium also produced large amounts of bright orange carotenoid pigments. These mycelia survived for about a year in 20° C., although growth ceased after six weeks. These viable but non-growing mycelia were transferred back to MFM plates without charcoal. Pigment production remained high for a few weeks, at which time a shift back to the whitish, rapidly growing surface mycelium occurred.

A sample of SNGT2-A mycelia was transferred from MFM plates to MFM liquid cultures and incubated at 20° C. in the dark. Mycelia from these liquid cultures had the characteristic smell of C. cibarius.

Axenic SNGT2-A mycelia growing on MFM agar plates without charcoal were transferred to Modified Melin-Norkrans medium (MMN) plates. Molina, R. & Palmer, J. in Methods and Principles of Mycorrhizal Research, N. C. Schenck, ed., American Phytopathological Society, St. Paul, Minn. (1982), pp. 115–129. SNGT2-A was able to grow under these conditions although growth was slower than on MS plates or MFM without charcoal.

Axenic SNGT2-A mycelia were also transferred from MFM plates to 2% malt agar. SNGT2-A was unable to grow was on 2% malt agar.

Example 3

Identification of SNGT2-A as C. cibarius

SNGT2-A was confirmed to be C. cibarius by analysis of ITS length and RFLP pattern. Ribosomal DNA (rDNA) from axenic SNGT2-A mycelia on MFM plates was amplified using PCR (polymerase chain reaction). The rDNA ITS region was chosen as the PCR target based on the interspecies variations previously described by Gardes et al., Can J. Bot., 69: 180–190 (1991). The primers used were ITS1, ITS4, ITS4-B and ITS1-F. White, T., et al., in PCR protocols: a guide to methods and applications, Innis, M., Gelfand, D., Sninsky, J., and White, T., eds., Academic Press, New York (1990) pp. 315–322; and Gardes, M. & Bruns, T., Mol. Ecol. 2: 113–118 (1993). The sequences of the primers used in these experiments are shown in Table 3.

Samples of frozen fruit bodies and axenic vegetative mycelium were directly crushed using a plastic pestle in an Eppendorf tube with 600 μl buffer (100 mM Tris-HCl pH 9.0, 1.4 M NaCl, 20 mM EDTA, 2% cetyltrimethylammonium bromide and 0.2% mercaptoethanol). Liquid nitrogen was not used. The extract was incubated with 0.1 mg proteinase K (Sigma) (dissolved in 2X CTAB-buffer) at 65° C. for 2 hours. The extract was then centrifuged for 5 min at 13000 rpm. The supernatant was removed and mixed with 500 μl Tris-saturated chloroform/phenol/iso-amyl alcohol (25:24:1 v/v/v) (Sigma) to remove residual protein.

TABLE 3

Primers Used to Amplify C. cibarius ITS

| Primer | Sequence | SEQ ID NO. |
|---|---|---|
| ITS1 | TCCGTAGGTGAACCTGCGG | |
| ITS4 | TCCTCCGCTTATTGATATGC | |
| ITS4-B | CAGGAGACTTGTACACGGTCCAG | |
| ITS1-F | CTTGGTCATTTAGAGGAAGTAA | |

The phenol and aqueous phases were separated by centrifuging for 15 min, and the water phase was then mixed with 400 μl pure chloroform to remove the phenol. RNAse was not used.

The water phase was centrifuged for 10 min and transferred to another tube and incubated overnight with 700 μl of 2-propanol in a freezer to precipitate DNA.

The DNA was pelleted by centrifugation (20 min) and washed twice with 300 μl of 70% ethanol. The pellet was dried for 15 minutes at 60° C. followed by 45 minutes at 20° C., and then dissolved in 50 μl of 10 mM Tris-HCl pH 8.0, 1 mM EDTA and stored at 4° C. until use.

Mycelium and fruit body DNA were diluted 1:100–1:1000. Each sample was mixed with an equal volume (25–50 μl) of PCR mixture. PCR mixture contained deoxynucleoside triphosphates (20 nmol each), primers ITS1 and ITS4 (20 pmol, unpurified, Bioprobe Systems, France), PCR buffer and Taq polymerase (2.5 units, Amersham). Two drops of mineral oil were added to prevent evaporation.

PCR was carried out in a DNA thermal cycler (Perkin Elmer Cetus) by incubating the mixture for 3 min at 95° C., followed by 35 amplification cycles of 2 min, 95° C., 25 sec, 50° C. and 2 min, 72° C. The reaction was then incubated for 10 min, 72° C. A sample of the reaction was electrophoresed on a 1% agarose gel and amplification products identified by ethidium bromide staining.

The length of the amplified ITS product from DNA from SNGT2-A vegetative mycelium corresponded with that of C. cibarius fruit body ITS products, using the ITS1 and ITS4 primers. The ITS product of C. cibarius was about 1400 base pairs in length. No amplification of SNGT2-A ITS was observed with the ITS4-B and ITS1-F primer pairs.

The amplified ITS product of SNGT2-A mycelial DNA was about 600–800 bp longer than the ITS product of the other basidiomycetes and Cantharellaceae members tested, C. tubaeformis, C. lutescens, C. melanoxeros, Gomphus clavatus, Hydnum repandum, Sarcodon imbricatus, and Suillus variegatus.

The amplified ITS product of C. cibarius strains was digested with MboI, HinfI or HaeIII, and separated by gel electrophoresis. After digestion with the three restriction enzymes, SNGT2-A and other C. cibarius strains produced identical RFLP patterns.

Example 4

DNA Fingerprinting of SNGT2-A

Modified Fries Medium agar plates were layered with a piece of cellophane (Biorad) and axenic mycelia of SNGT2-A was placed on top of the cellophane. Plates were incubated as described in Example 2 for about 8 weeks. Mycelia were scraped off of the cellophane and about 0.2 g (fresh weight) peripheral mycelium were ground in liquid nitrogen. The powder was transferred to Eppendorf tubes with 600 μl extraction buffer (5 mM ascorbic acid, 1.4M NaCl, 20 mM EDTA, 2% w/v CTAB (cetyltrimethylammonium bromide), 100 mM Tris-HCl pH 7.5). About 10 μl 0.5 mg/ml RNAse A (Sigma, St. Louis, Mo.) was then added. After incubation for 1 hour at 55° C., 600 μl chloroform was added and the mixture was shaken by hand for 2 minutes. The samples were centrifuged for 2 minutes and 500 μl of the aqueous phase of each sample was transferred to a new tube to which 50 μl potassium acetate (5M) and 1100 μl ice cold ethanol was added. After incubating for 2 hours in a freezer, the tubes were centrifuged for 5 minutes. The pellet was washed once with 700 μl ice cold ethanol followed by partial drying under vacuum. About 30–50 μl TE (10 mM Tris-HCl pH 8.0, 1 mM EDTA) was added to the pellet, and the DNA was dissolved overnight at 37° C. Quantification of DNA was carried out using a micro assay fluorometry kit (TKO-100, Hoeffer Scientific, San Francisco) according to the vendor's protocol. Axenic mycelia from eleven other C. cibarius strains was isolated in a similar manner.

PCR reactions were set up in thin-walled 200 μl, self-capped tubes with 16 μl sterile water, 2.5 μl 10X Taq buffer with Mg++ (Boehringer Mannheim), 0.5 μl 2'-deoxynucleoside 5'-triphosphate mix (Boehringer Mannheim), 0.4 μl Taq polymerase (0.2 units, Boehringer Mannheim), 1.0 μl of OPS primer (15 picomoles, Operon Technologies, Alameda, Calif.) and 5 μl of extracted mycelial DNA (2 ng/μl).

Amplification was conducted in a Perkin-Elmer hot bonnet thermocycler (Gene Amp PCR System 2400) using the following cycle program: 94° C., 30 sec., followed by 45 cycles of 94° C., 5 sec.; 40° C., 45 sec.; 72° C., 2 min. The program ended by incubating the mixture at 72° C. for 7 minutes. The mixture was stored at 4° C. until use. Amplified products were electrophoresed on 1.8% agarose gels buffered in 0.5X TBE with addition of ethidium bromide (8μg/200 ml) and photographed with UV light. As controls, amplification mixtures without DNA were used with each primer.

Six different decanucleotide primers were used (Kit S, Operon Technologies; OPS 02, OPS 04, OPS 05, OPS 10, OPS 15 and OPS 17). The sequences of the primers used in this experiment are shown in Table 4.

TABLE 4

Primers for Amplification of C. ciharius DNA

| Code | 5' to 3' |
|---|---|
| OPS-02 | CCTCTGACTG |
| OPS-04 | CACCCCCTTG |
| OPS-05 | TTTGGGGCCT |
| OPS-10 | ACCGTTCCAG |
| OPS-15 | CAGTTCACGG |
| OPS-17 | TGGGGACCAC |

The DNA fingerprint of each strain was unique. The DNA fingerprint for SNGT2-A, shown in FIG. 1, was different from all other C. cibarius strains tested. No bands were observed in amplified controls without C. cibarius DNA.

To the extent not already indicated, it will be understood by those of ordinary skill in the art that any one of the various specific embodiments herein described and illustrated may be further modified to incorporate features shown in other of the specific embodiments.

The foregoing detailed description has been provided for a better understanding of the invention only and no unnecessary limitation should be understood therefrom as some modifications will be apparent to those skilled in the art without deviating from the spirit and scope of the appended claims.

What is claimed is:

1. Isolated mycelium of a chanterelle designated SNGT2-A.

2. The mycelium of claim 1, wherein said mycelium is substantially purified.

3. The mycelium of claim 2, wherein said mycelium is axenic.

4. A chanterelle mycelium derived from a subculture of strain SNGT2-A.

5. The mycelium of claim 4, wherein said mycelium is substantially purified.

6. The mycelium of claim 5, wherein said mycelium is axenic.

7. Isolated mycelium of a chanterelle having substantially the same DNA fingerprint as shown in FIG. 1.

8. A method for propagating a chanterelle mycelium comprising the steps of:

a) culturing an SNGT2-A mycelium on a first growth medium; and b) reinoculating at least a portion of said SNGT2-A mycelium on a second growth medium.

9. The method of claim 8 wherein said first or said second growth medium comprises Modified Fries Medium.

* * * * *

UNITED STATES PATENT AND TRADEMARK OFFICE
CERTIFICATE OF CORRECTION

PATENT NO.    : 6,173,525 B1
DATED         : January 16, 2001
INVENTOR(S)   : Eric Danell It is certified that error appears in the above-identified patent and that said Letters Patent is hereby corrected as shown below:

<u>Column 10,</u>
Please insert the following claim after claim 9:
-- 10. The method of claim 8 wherein said first or said second growth medium comprises Murashige and Skoog Medium. --

Signed and Sealed this

Twenty-sixth Day of March, 2002

Attest:

JAMES E. ROGAN
*Attesting Officer*    *Director of the United States Patent and Trademark Office*